(12) United States Patent
Evans (10) Patent No.: US 10,576,698 B2
(45) Date of Patent: Mar. 3, 2020

(54) COMPOSITE STRUCTURES (71) Applicant: AIRBUS OPERATIONS LIMITED, Bristol (GB)

(72) Inventor: Steven Evans, Bristol (GB)

(73) Assignee: Airbus Operations Limited, Bristol (GB)

( * ) Notice: Subject to any disclaimer, the term of this patent is extended or adjusted under 35 U.S.C. 154(b) by 430 days.

(21) Appl. No.: 15/147,513

(22) Filed: May 5, 2016

(65) Prior Publication Data

US 2016/0325510 A1 Nov. 10, 2016

(30) Foreign Application Priority Data

May 7, 2015 (GB) .................................. 1507838.9

(51) Int. Cl.
| | | |
|---|---|---|
| *E04C 2/02* | (2006.01) | |
| *B29C 70/44* | (2006.01) | |
| *B29D 99/00* | (2010.01) | |
| *B29C 70/86* | (2006.01) | |
| *E04C 2/26* | (2006.01) | |
| *B29L 31/30* | (2006.01) | |

(52) U.S. Cl.
CPC .............. *B29C 70/44* (2013.01); *B29C 70/86* (2013.01); *B29D 99/0014* (2013.01); *B29L 2031/3076* (2013.01); *E04C 2/26* (2013.01); *Y02T 50/43* (2013.01)

(58) Field of Classification Search
CPC ............................................. Y10T 428/12375
See application file for complete search history.

(56) References Cited

U.S. PATENT DOCUMENTS

| | | | |
|---|---|---|---|
| 3,950,115 A | 4/1976 | Euler | |
| 7,195,418 B2 * | 3/2007 | Durand | ..................... B64C 1/26 |
| | | | 403/217 |
| 2014/0030478 A1 | 1/2014 | Wittenberg | |
| 2014/0186586 A1 | 7/2014 | Victorazzo | |
| 2014/0299257 A1 | 10/2014 | Pearson et al. | |

FOREIGN PATENT DOCUMENTS

| | | |
|---|---|---|
| EP | 2676787 A1 | 12/2013 |
| EP | 2689918 A1 | 1/2014 |
| FR | 2252916 A1 | 6/1975 |
| WO | 02066235 A1 | 8/2002 |
| WO | 2006131532 A1 | 12/2006 |

OTHER PUBLICATIONS

UKIPO Search Report dated Nov. 10, 2015 issued in Great Britain Application No. 1507838.9.
European Search Report dated Sep. 12, 2016 EP Application No. 16166086.
European Office Action for Application No. 16166086.5 dated Sep. 21, 2018.

* cited by examiner

*Primary Examiner* — Adam Krupicka
(74) *Attorney, Agent, or Firm* — Jenkins, Wilson, Taylor & Hunt, P.A.

(57) ABSTRACT

A combined composite and metal hybrid component and a method of forming said component, are disclosed, the component comprising a substantially sheet-like or web-like body portion, made of a composite material, at least one stiffening member made of a metal and at least one made of a composite material, and curing the component in a vacuum bag, such that the metal stiffening member is formed against the composite stiffening member and the metal stiffening member remains a part of the hybrid composite component.

20 Claims, 8 Drawing Sheets

COMPOSITE STRUCTURES

RELATED APPLICATIONS

The present application claims priority from Great Britain Application No. 1507838.9, filed May. 7, 2015, the disclosure of which is hereby incorporated by reference herein in its entirety.

FIELD OF THE INVENTION

The present invention relates to combined metal and composite components and methods for the manufacture of such components. In particular, the invention relates to hybrid components comprising integrally formed composite and metallic elements, and methods of forming such hybrid components, which take advantage of the properties of both the metallic and composite materials in a single component.

BACKGROUND OF THE INVENTION

Generally in the past, structural parts for vehicles such as aircraft have been made from metals such as, for example, titanium or aluminium or similar alloys, depending upon the function of the part. Increasingly in recent years, composite materials have been used to manufacture certain parts of an aircraft, such as, for example, a wing skin. Similarly, fuselage skins, which have generally been constructed of aluminium and titanium in the past, have begun to be replaced with composite materials.

When incorporating composite materials into structures it is generally necessary to provide a layup in a mould, and such a mould is commonly referred to as the "tooling" for the forming process. The composite materials are then cured under high pressure, in the tooling, to create the necessary component. Manufacturing costs of such tooling and the resulting investment are high, as the tooling is specific to a particular component, has to be much larger and structurally more robust than the component which it is used to manufacture. Traditional tooling therefore has a high non-recurring cost (NRC). Further, any changes in the shape or design of the component being formed can result in at least re-working of the tooling being necessary, or potentially complete disposal of the tooling and re-manufacture of new tooling, resulting in a high re-tooling cost of any design revisions.

An issue which arises with the increasing use of composite materials is how to deal with the relatively large tolerances which are inherent in the curing process and result in low predictability of cured part thickness (CPT) and uncured part thickness (UCPT). This can make the assembly procedure more complex and time consuming, since adjustment and compensation for varying tolerances of composite parts must be made during the assembly procedure. Further, the attachment of neighbouring components to composite parts can be difficult and forming the necessary projections, lugs and attachment portions to enable this can be a complex and expensive procedure. Moreover, due to the non-conductivity of composite parts, compensatory adjustments and additional conductive paths may need to be incorporated in the structure or overall assembly in certain cases, to ensure effective lightning strike protection of the structure as a whole. This is particularly the case in aircraft structures.

SUMMARY OF THE INVENTION

A first aspect of the invention provides a method of making a hybrid metal-composite component for forming a generally sheet-like or web-like part of a structure, preferably an aircraft structure, comprising the steps of:
  a) providing a lay-up comprising a substantially sheet-like or web-like body portion, comprising a composite material;
  b) arranging on the body portion at least one first stiffening member, the first stiffening member comprising a solid material and having a substantially planar stiffening portion extending away from the body portion;
  c) providing a further lay-up to form at least one second stiffening member comprising a composite material and having a substantially planar stiffening portion extending away from the body portion and disposed adjacent the stiffening portion of the first stiffening member:
  d) the method further comprising curing the component in a vacuum bag, such that the second stiffening member is formed against the first stiffening member and the first stiffening member remains a part of the resulting composite component.

A second aspect of the invention provides a hybrid metal-composite component for forming a generally sheet-like or web-like part of a structure, preferably of an aircraft structure, the hybrid component comprising:
  a substantially sheet-like or web-like body portion, comprising a composite material;
  at least one first stiffening member, comprising a solid material and having a substantially planar stiffening portion extending away from the body portion; and
  at least one second stiffening member comprising a composite material and having a substantially planar stiffening portion extending away from the body portion and disposed adjacent the stiffening portion of the first stiffening member;
  wherein the body portion, and the second stiffening member are formed to the first stiffening member, such that the first and second stiffening members provide stiffness to the body portion.

In addressing the drawbacks of the prior art, the present invention provides a method for forming hybrid metallic and composite components, in which one or more metallic members or elements are cured into the structure of a resulting hybrid component. The metallic elements or members act as tooling against which the composite elements can be formed and cured. The metallic elements or members can form a structural part of the component and can provide attachment portions which are integrally formed into the resulting hybrid component.

The advantages of the method and the resulting hybrid component of the invention are numerous. The invention allows the layup to be laid directly onto accurately manufactured metallic tooling which is incorporated into the component, which can reduce the total thickness tolerances of the resulting hybrid component by making the composite elements of the hybrid component thinner and potentially more accurately dimensioned. This is done by utilising the metallic elements' rigidity and stiffness properties to hold better tolerances through the manufacturing process, resulting in a more accurate geometry of the finished component. The spring-back and shrinkage effects of composites are reduced by using the properties of the metallic elements incorporated into the end product. The spring-back effect can even be used to increase stiffness of the overall hybrid component further by utilising the spring-back effect on both sides of a metallic element to effectively "brace" the structure. The metallic and composite elements are integrated into the final component in a "one shot" cure, preferably in a vacuum bag, enabling the simple integration of a number of elements at narrowly controlled tolerances.

A product according to the invention provides a component which comprises at least one metallic element and at least one composite element. The component can form part of a larger assembly, such as part of an aircraft wing.

The invention can find numerous areas of implementation in all manner of structures and vehicle components. For example, in the aircraft industry, the invention can be applied to covers for wings and the like, spars, stringers and fuselage components.

The first stiffening member may comprise a base portion extending generally parallel to the body portion. This can allow improved support of the body portion by the stiffening member.

The second stiffening member may comprise a base portion extending generally parallel to the body portion. This can allow improved forming of the second stiffening member to the body portion and the first stiffening member.

The base portion of the first or second stiffening member may be bonded to the body portion. This can assist with the assembly of the layup prior to manufacture and can improve the overall integrity of the resulting hybrid component.

The second stiffening member or members may be bonded to the second stiffening member or members. This can assist with the assembly of the layup prior to manufacture and can improve the overall integrity of the resulting hybrid component.

The bonding function may be provided by an adhesive joint, preferably comprising an adhesive activated by the curing process. The adhesive is preferably a film, a filler, a glue or a bond.

The first stiffening member or members may comprise a metal. Preferably the metallic element comprises one or more of titanium or a titanium alloy. Titanium may be used in combination with other composites materials to eradicate any of the corrosion issues related to the use of other metallic materials and composite in combination. Other metallic materials may be used, but most would require a protective barrier to prevent corrosion. Alternative materials could include aluminum, steel or steel variants such as stainless or high speed steel, and other ferrous or non-ferrous metals. With all materials combined in the component of the invention, thermal expansion would need to be managed because of possible differences in coefficients of thermal expansion between composites and other materials such as metals and alloys. A particularly advantageous material may be Invar, also known generically as FeNi36, or 64FeNi under classification commonly used in the United States of America, which is a nickel-iron alloy having a particularly low coefficient of thermal expansion, which would be more comparable to that of the composite portions of the part.

In certain cases, as is known in the art, the thermal expansion of mould tooling can be utilised to help with consolidation of the plies when curing a composite material. By optimisation of tooling thicknesses, it is possible to add extra consolidation where needed in specific areas of the part. Such techniques are usually employed because composite parts when manufactured can have extra thickness in them that can be attributed to bulk or trapped air. In certain components with radii or corners the consolidation process induces wrinkles so the tool design can be tailored to press out the extra thickness in a way that does not cause the material to wrinkle or buckle. The combination of a first stiffening member in the component of the present invention having a different coefficient of thermal expansion to the composite elements can enable these techniques to be employed in elements which are integral to the component being manufactured.

The first stiffening member of the invention may comprise one or more attachment portions disposed on at least one of its base portion and/or its stiffening portion, preferably extending away from the base portion. This allows attachment portions to be provided on a metallic element integrated into the final component, which means that the necessary tolerances can be defined during the curing process by correct machining and positioning of the metallic elements, while the composite elements can provide increased strength and stiffness with zero or reduced impact on the tolerances.

The second stiffening member may comprise one or more co-cured composite attachment portions, preferably extending away from its base portion. This can provide attachment portions cured into the composite portions of the resulting hybrid element in addition to, or as an alternative to, those provided on the first stiffening member.

The first stiffening member may comprise an edge protecting portion, arranged to protect an edge of the second stiffening member from damage.

The edge protecting portion may be provided on a stiffening portion of the first stiffening member.

The edge protecting portion may be a laterally extending edge protecting extension, for extending over an edge of the second stiffening member to protect the edge of the second stiffening member from damage.

The first stiffening member may comprise a plurality of edge protecting extension portions, for protecting second stiffening members disposed on opposing sides of the stiffening portion of the first stiffening member. These above features can provide a degree of edge protection, preferably at the extremities of the composite element of the final component, which increases the overall hybrid component's resilience to damage during the manufacturing, assembly and use of the component. This enables edge protecting extension portions to be provided on the metallic elements to protect edges of plural adjacent composite elements, or separate parts of a single adjacent composite portion of the component.

The first stiffening member may comprise a lip projecting laterally from its stiffening portion to provide a smoothed contour between the body portion of the component and the stiffening portion of the first stiffening member.

The lip may be disposed at an intersection between the base portion and the stiffening portion of the first stiffening member, the lip projecting outwardly to provide a smoothed contour between the body portion of the overall component and the stiffening portion of the first stiffening member. The provision of the lip can address an issue which can occur when a composite layup comprises a curved portion which curves away from a substantially planar portion. For example, when one layup curves away from another layup, it is possible that a substantially triangular gap is created where the first layup curves away from the second layup. This gap can be filled with a separate component having a corresponding substantially triangular cross-section, known as a 'noodle'. However, these can be complex and expensive to manufacture and assemble into the final component or structure. Providing a lip projecting outwardly from an adjacent metallic element can help to fill that gap by providing a smooth contour for the first layup to follow when laid on the planar component and an adjacent member such as the metallic stiffening member described herein.

Preferably, in the method of the first aspect in step (b) the or each at least one first stiffening member has one or more substantially planar stiffening portions, and step (c) preferably comprises providing a substantially U-shaped second stiffening member having two substantially planar stiffening portions extending away from the body portion such that each said stiffening portion abuts a different stiffening portion of the at least one first stiffening member or of one of the at least one first stiffening members, whereby in step (d) the second stiffening member is formed against said different stiffening portions.

Similarly, in the component of the second aspect the or each at least one first stiffening member preferably has one or more substantially planar stiffening portions, and the at least one second stiffening member is preferably substantially U-shaped such that it has two substantially planar stiffening portions extending away from the body portion, wherein each said stiffening portion abuts a different stiffening portion of the at least one first stiffening member or of one of the at least one first stiffening members, whereby the body portion and the second stiffening member are formed to the different stiffening portions such that the first and second stiffening members provide stiffness to the body portion.

The second stiffening member may comprise a plurality of stiffening portions extending away from its base portion. This increases the stiffening function provided by a single second stiffening member.

The component may comprise a plurality of first stiffening members and at least one second stiffening member disposed between adjacent first stiffening members. This allows for the provision of a composite element laid up between adjacent pairs of, preferably metallic, first stiffening members, so that stiffening portions of the second composite stiffening member can be formed against adjacent first stiffening members, which can assist in supporting the composite stiffening members in the curing process.

The second stiffening member may comprise a base portion and a plurality of stiffening portions extending away from its base portion and disposed adjacent stiffening portions of separate first stiffening members arranged on either side of the second stiffening member. This arrangement can provide a substantially u-shaped profile on at least a part of the overall profile of the second stiffening member. This increases the overall structural rigidity and stiffening function of the second stiffening member The first stiffening member may comprise a plurality of stiffening portions extending away from its base portion. This arrangement can provide a substantially u-shaped profile on at least a part of the overall profile of the first stiffening member. This increases the overall structural rigidity and functioning of the first stiffening member and can also permit it to support adjacent second composite stiffening members disposed on either side of its preferably substantially u-shaped profile.

The component may comprise alternating first and second stiffening members disposed on a surface of the body portion. This enables the composite and metallic stiffening members to be alternated, allowing adjacent composite stiffening members to be supported during the curing process by adjacent metallic stiffening members.

At least one second stiffening member may be disposed substantially between adjacent stiffening portions of the first stiffening member. In this manner, a composite stiffening member can be provided and fully supported by a single first, metallic, stiffening member during the curing process.

The second stiffening member may comprise a base portion and a pair of stiffening portions extending away from opposing sides of its base portion. The stiffening portions of a second stiffening member may be disposed adjacent separate stiffening portions of a single first stiffening member. This allows the composite stiffening member to be fully supported by a single metallic stiffening member during the curing process.

The component may comprise plural second stiffening members disposed between plural pairs of stiffening portions of a first stiffening member. This can allow plural composite stiffening members to be supported by plural pairs of metallic stiffening portions of a single first stiffening member during the curing process.

The first stiffening member may be substantially covered on its base side by the body portion and may be substantially covered on its opposing side by plural second stiffening members. In this arrangement, the metallic first stiffening element can act as a form of internal stiffening structure, which is entirely, or almost entirely, enveloped in composite material, optionally with the exception of edge portions of the first stiffening member. This further allows the first stiffening element to act as part of the tooling for defining the structure of the composite elements during the forming process and the curing process, and also forms an integral part of the final component.

The method of the invention may further comprise the steps of providing any of the preferred features of the component described above. In particular, the following preferred steps may be included.

Providing the second stiffening member may comprise providing a base portion extending generally parallel to the body portion.

The method may comprise bonding the base portion of the first or second stiffening member to the body portion.

The method may comprise bonding the second stiffening member or members to the second stiffening member or members.

The bonding may be provided by an adhesive joint. The joint may comprise an adhesive activated by the curing process. The adhesive may be a film, a filler, a glue or a bond.

The method may comprise providing one or more co-cured composite attachment portion(s) on the second stiffening member.

The co-cured composite attachment portion may be disposed so as to extend away from the base portion of the second stiffening member.

Providing the second stiffening member may comprise providing a plurality of stiffening portions extending away from its base portion.

The method may comprise providing the hybrid component with a plurality of first stiffening members and at least one second stiffening member disposed between adjacent first stiffening members.

Providing the second stiffening member may comprise providing a base portion and a plurality of stiffening portions extending away from the base portion of the second stiffening member and disposed adjacent stiffening portions of separate first stiffening members arranged on either side of the second stiffening member.

The method may comprise providing alternating first and second stiffening members on a surface of the body.

The method may comprise providing at least one second stiffening member substantially between adjacent stiffening portions of the first stiffening member.

The method may comprise providing the second stiffening member with a base portion and a pair of stiffening portions extending away from opposing sides of its base portion, the stiffening portions of the second stiffening member being provided adjacent separate stiffening portions of a first stiffening member.

The method may comprise providing plural second stiffening members, disposed between plural pairs of stiffening portions of the first stiffening member.

The method may comprise arranging the component such that the first stiffening member is substantially covered on its base side by the body portion and is substantially covered on its opposing side by plural second stiffening members.

The invention further provides a structure, preferably of an aircraft, comprising a component according to the invention, or manufactured according to the method of the invention.

The following clauses introduce further features of the invention:

1. A method of making a hybrid metal-composite component for forming a generally sheet-like or web-like part of a structure, comprising the steps of:
   a) providing a lay-up comprising a substantially sheet-like or web-like body portion, comprising a composite material:
   b) arranging on the body portion at least two first stiffening member, the first stiffening member comprising a solid material and having a substantially planar stiffening portion extending away from the body portion;
   c) providing a further lay-up to form at least one second stiffening member comprising a composite material and having a substantially planar stiffening portion extending away from the body portion and disposed adjacent the stiffening portion of the first stiffening member,
   d) the method further comprising curing the component in a vacuum bag, such that the second stiffening member is formed against the first stiffening member and the first stiffening member remains a part of the resulting composite component
2. A method according to clause 1, wherein the first stiffening member comprises a base portion extending generally parallel to the body portion.
3. A method according to any of clauses 1 or 2, wherein providing the second stiffening member comprises providing a base portion extending generally parallel to the body portion.
4. A method according to any of clauses 2 or 3, comprising bonding the base portion of the first or second stiffening member to the body portion.
5. A method according to any of clauses 1 to 4, comprising bonding the second stiffening member or members to the second stiffening member or members.
6. A method according to any of clauses 4 or 5, wherein the bonding is provided by an adhesive joint
7. A method according to clause 6, wherein the joint comprises an adhesive activated by the curing process.
8. A method according to clause 7, wherein the adhesive is a film, a filler, a glue or a bond.
9. A method according to any of clauses 1 to 8, wherein the first stiffening member or members comprise(s) a metal.
10. A method according to clause 9, wherein the metal is comprises one or more of: titanium, a titanium alloy, aluminium, steel, steel variants such as stainless or high speed steel, other ferrous or non-ferrous metals or a nickel-iron alloy.
11. A method according to any of the preceding clauses, wherein the first stiffening member comprises one or more attachment portions disposed on at least one of its base portion and/or its stiffening portion.
12. A method according to clause 11, wherein the attachment portion(s) extend away from the base portion.
13. A method according to any of clauses 1 to 12, comprising providing one or more co-cured composite attachment portion(s) on the second stiffening member.
14. A method according to clause 13, wherein the co-cured composite attachment portion is disposed so as to extend away from the base portion of the second stiffening member.
15. A method according to any of the preceding clauses, wherein the first stiffening member comprises an edge protecting portion, arranged to protect an edge of the second stiffening member from damage.
16. A method according to clause 15, wherein the edge protecting portion is provided on a stiffening portion of the first stiffening member.
17. A method according to clause 16, wherein the edge protecting portion is a laterally extending edge protecting extension, for extending over an edge of the second stiffening member to protect it from damage.
18. A method according to any of clauses 1 to 17, wherein the first stiffening member comprises a plurality of edge protecting extension portions, for protecting second stiffening members disposed on opposing sides of the stiffening portion of the first stiffening member.
19. A method according to any of the preceding clauses, wherein the first stiffening member comprises a lip projecting laterally from its stiffening portion to provide a smoothed contour between the body portion of the component and the stiffening portion of the first stiffening member.
20. A method according to any of the preceding clauses, wherein the providing the second stiffening member comprises providing a plurality of stiffening portions extending away from its base portion.
21. A method according to any of clauses 1 to 20, comprising providing the hybrid component with a plurality of first stiffening members and at least one second stiffening member disposed between adjacent first stiffening members.
22. A method according to clause 21, wherein providing the second stiffening member comprises providing a base portion and a plurality of stiffening portions extending away from the base portion of the second stiffening member and disposed adjacent stiffening portions of separate first stiffening members arranged on either side of the second stiffening member.
23. A method according to any of the preceding clauses, wherein the first stiffening member comprises a plurality of stiffening portions extending away from its base portion.
24. A method according to any of the preceding clauses, comprising providing alternating first and second stiffening members on a surface of the body.
25. A method according to any of clauses 1 to 24, comprising providing at least one second stiffening member substantially between adjacent stiffening portions of the first stiffening member.
26. A method according to clause 25, comprising providing the second stiffening member with a base portion and a pair of stiffening portions extending away from opposing sides of its base portion, the stiffening portions of the second stiffening member being provided adjacent separate stiffening portions of a first stiffening member.

27. A method according to clause 26, comprising providing plural second stiffening members, disposed between plural pairs of stiffening portions of the first stiffening member.

28. A method according to clause 27, wherein the first stiffening member is substantially covered on its base side by the body portion and is substantially covered on its opposing side by plural second stiffening members.

29. A hybrid metal-composite component for forming a generally sheet-like or web-like part of a structure, the hybrid component comprising:
a substantially sheet-like or web-like body portion, comprising a composite material;
at least one first stiffening member, comprising a solid material and having a substantially planar stiffening portion extending away from the body portion; and
at least one second stiffening member comprising a composite material and having a substantially planar stiffening portion extending away from the body portion and disposed adjacent the stiffening portion of the first stiffening member;
wherein the body portion, and the second stiffening member are formed to the first stiffening member, such that the first and second stiffening members provide stiffness to the body portion.

30. A component according to clause 29, wherein the first stiffening member comprises a base portion extending generally parallel to the body portion.

31. A component according to any of clauses 29 or 30, wherein the second stiffening member comprises a base portion extending generally parallel to the body portion.

32. A component according to any of clauses 30 or 31, wherein the base portion of the first or second stiffening member(s) is bonded to the body portion.

33. A component according to any of clauses 29 to 32, wherein the second stiffening member or members is/are bonded to the second stiffening member or members.

34. A component according to any of clauses 32 or 33, wherein the bonding is provided by an adhesive joint.

35. A component according to clause 34, wherein the joint comprises an adhesive activated by the curing process.

36. A component according to clause 35, wherein the adhesive is a film, a filler, a glue or a bond.

37. A component according to any of clauses 29 to 36, wherein the first stiffening member or members comprise a metal.

38. A component according to clause 37, wherein the metal comprises one or more of: titanium, a titanium alloy, aluminium, steel, steel variants such as stainless or high speed steel, other ferrous or non-ferrous metals or a nickel-iron alloy.

39. A component according to any of the preceding clauses, wherein the first stiffening member comprises one or more attachment portions disposed on at least one of its base portion and/or its stiffening portion.

40. A component according to clause 39, wherein the attachment portion(s) extend away from the base portion.

41. A component according to any of clauses 29 to 40, wherein the second stiffening member comprises one or more co-cured composite attachment portion(s).

42. A component according to clause 41, wherein the co-cured attachment portion(s) extend away from the base portion of the second stiffening member.

43. A component according to any of clauses 29 to 42, wherein the first stiffening member comprises an edge protecting portion, arranged to protect an edge of the second stiffening member from damage.

44. A component according to clause 43, wherein the edge protecting portion is disposed on a stiffening portion of the first stiffening member.

45. A component according to clause 44, wherein the edge protecting portion is a laterally extending edge protecting extension, for extending over an edge of the second stiffening member to protect it from damage.

46. A component according to any of clauses 29 to 45, wherein the first stiffening member comprises a plurality of edge protecting extension portions, for protecting second stiffening members disposed on opposing sides of the stiffening portion of the first stiffening member.

47. A component according to any of clauses 29 to 46, wherein the first stiffening member comprises a lip projecting laterally from its stiffening portion to provide a smoothed contour between the body portion of the component and the stiffening portion of the first stiffening member.

48. A component according to any of clauses 29 to 47, wherein the second stiffening member comprises a plurality of stiffening portions extending away from its base portion.

49. A component according to any of clauses 29 to 48, comprising a plurality of first stiffening members and at least one second stiffening member disposed between adjacent first stiffening members.

50. A component according to clause 49, wherein the second stiffening member comprises a base portion and a plurality of stiffening portions, extending away from its base portion and disposed adjacent stiffening portions of separate first stiffening members arranged on either side of the second stiffening member.

51. A component according to any of clauses 29 to 50, wherein the first stiffening member comprises a plurality of stiffening portions extending away from its base portion.

52. A component according to any of clauses 29 to 51, wherein the component comprises alternating first and second stiffening members disposed on a surface of the body.

53. A component according to any of clauses 29 to 52, wherein at least one second stiffening member is disposed substantially between adjacent stiffening portions of the first stiffening member.

54. A component according to clause 53, wherein the second stiffening member comprises a base portion and a pair of stiffening portions extending away from opposing sides of its base portion, the stiffening portions of the second stiffening member being disposed adjacent separate stiffening portions of a first stiffening member.

55. A component according to clause 54, comprising plural second stiffening members, disposed between plural pairs of stiffening portions of the first stiffening member.

56. A component according to clause 55, wherein the first stiffening member is substantially covered on its base side by the body portion and is substantially covered on its opposing side by plural second stiffening members.

57. A structure comprising a hybrid component according to any of clauses 29 to 56.

58. A structure according to clause 57, wherein the structure is an aircraft structure,

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
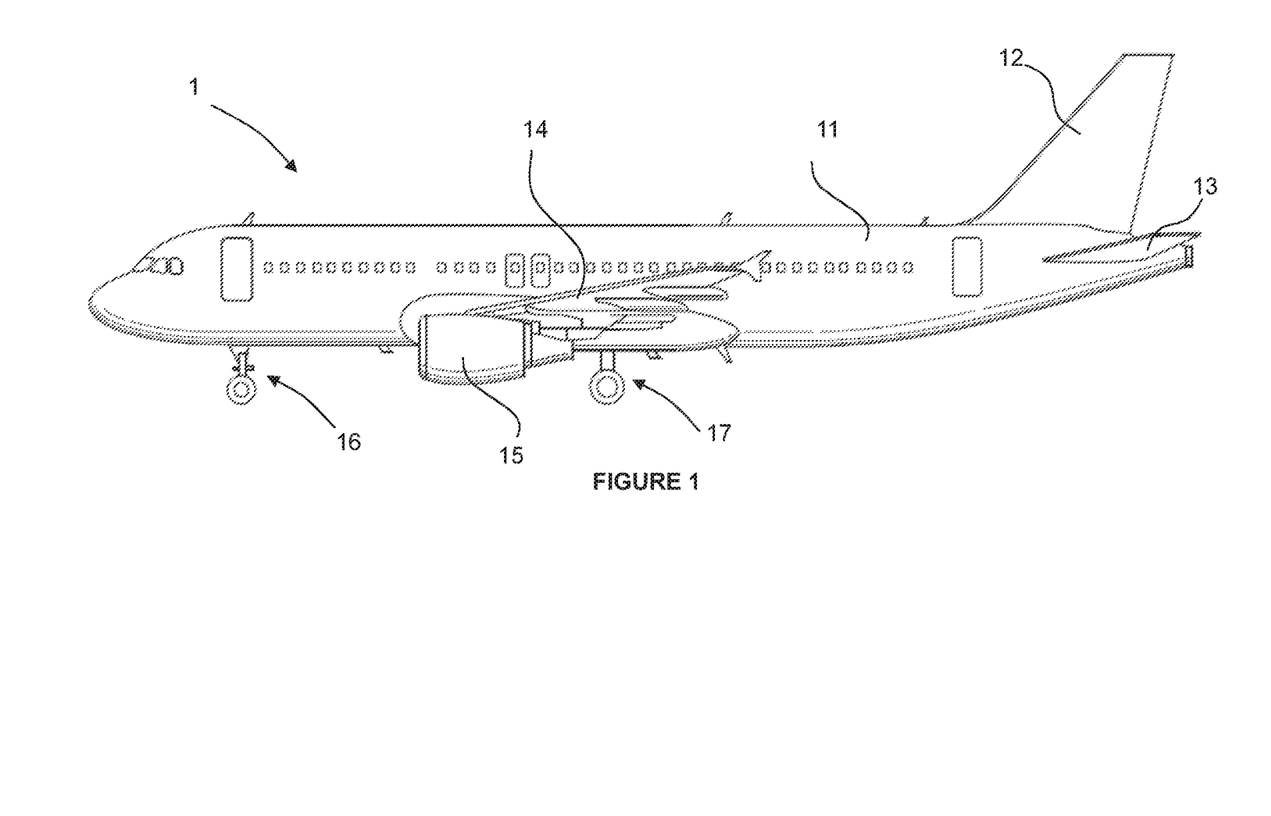
FIG. 1 shows an aircraft into which hybrid metal-composite components of the invention can be incorporated.

FIG. 1 shows an aircraft 1 into which hybrid components according to the invention can be incorporated. The invention relates to generally sheet-like, web-like, planar or curved-planar components, which can form parts of the primary structure of the aircraft, for example, forming parts of the fuselage 11, parts of the vertical tail fin 12, or the horizontal tail planes 13. Components of the invention may also be integrated into a wing 14, elements of an engine housing 15, and even into parts of the under carriage 16 and 17, or doors for the under carriage. The invention relates to the stiffening of generally sheet or web-like components such as wing skins, or generally web-like features of bulkheads, spars or ribs of an aircraft, for beams and bulkheads for any structure, as examples.

Figure 2A:
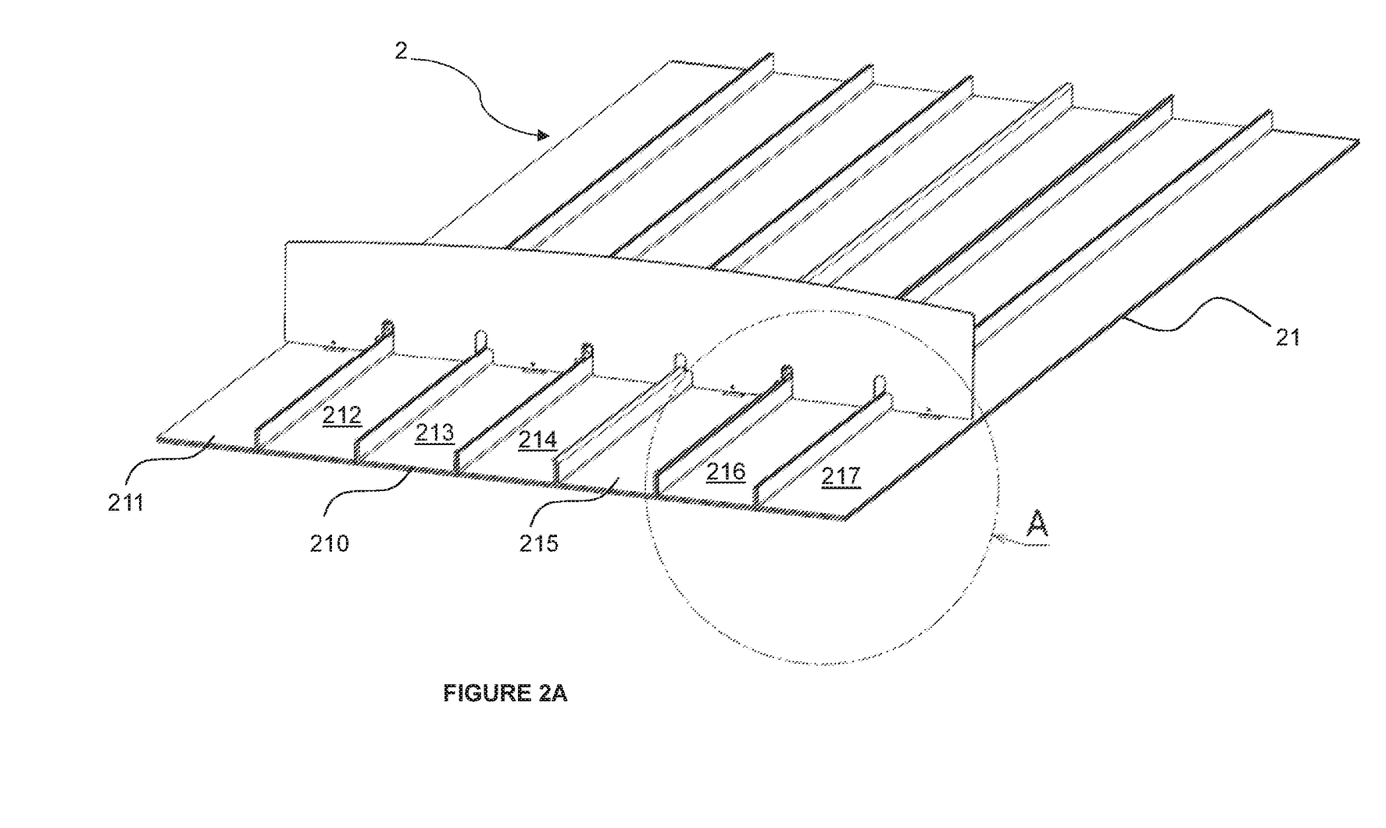
FIG. 2A shows an assembly incorporating a first embodiment of a component according to the invention.

FIG. 2A shows an assembly incorporating a component constructed according to an embodiment of the invention. The assembly 2 includes a component 21 which generally comprises a planar body portion 210. Arranged upon the planar body portion 210 are a plurality of first stiffening members 211, 213, 215 and 217. The first stiffening members are made from a generally rigid material. Such materials are preferably metallic and may include steel or aluminium but more preferably titanium, titanium alloys, invar as described above, or any such metals or materials as described herein for the first stiffening member.

Each of the first stiffening members has a base which is arranged substantially parallel with the body portion 210 and has at least one, preferably a pair of, stiffening portions which projects away from the base, generally giving the first stiffening members a U-shaped cross section in the case of members 213 and 215 and a substantially L-shaped cross section in the case of members 211 and 217, although any combination of I-shaped, U-shaped and/or L-shaped members may be used depending on the specific requirements for the component being formed.

Arranged in between the first stiffening members, on the body portion 210, are a plurality of second stiffening members 212, 214 and 216. The second stiffening members are formed of a composite material and each has a substantially U-shaped form, having a base which is arranged against the body portion 210, and at least one, preferably two, stiffening portions projecting away from the base, generally either side of the base, to form one or both sides of a "U", or an "L" shape. One, some or all of the first and second stiffening members may be bonded to the body portion at its base portion. One, some or all of the first and second stiffening members may be bonded to the adjacent respective first or second stiffening member to provide general structural integrity to the overall component. An adhesive film or any suitable glue or bonding agent, can be applied to the respective interfacing faces to provide this bonding function.

Figure 2B:
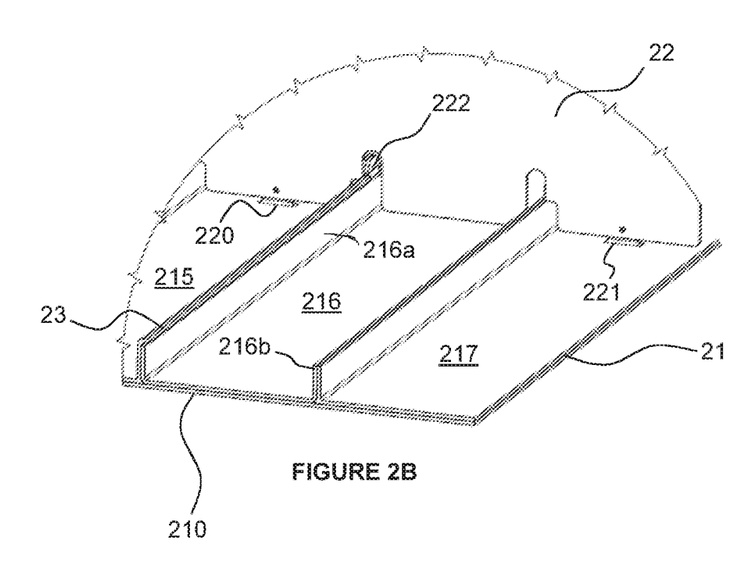
FIG. 2B shows exploded detail of the assembly of FIG. 2A.

FIG. 2B shows an exploded detail of the region marked A in FIG. 2A. As can be seen, second stiffening member 216 has been arranged as a lay-up on the body portion 210, with the stiffening portions 216a and 216b laid up against adjacent first stiffening members 215 and 217. First stiffening member 215 has been provided with an attachment portion 220 in the form of a lug projecting away from the base of the stiffening member and attached thereto. A similar lug 221 has been provided on first stiffening member 217, arranged to project from its base portion. A further attachment portion 222 has been provided on a stiffening portion of first stiffening member 215, to provide an attachment portion at a greater distance from the base of stiffening member 215. These attachment portions (collectively or individually) allow connection of the component 21 to an adjacent component 22, which may be, for example, a spar, or a rib or any other adjacent component of a structure as generally required by the specific implementation in question. First stiffening member 215 also includes an optional edge protecting extension 23, which is arranged to extend over an edge of the adjacent second stiffening member 216 to protect the edge from damage, either during use or during assembly.

Figure 3A:
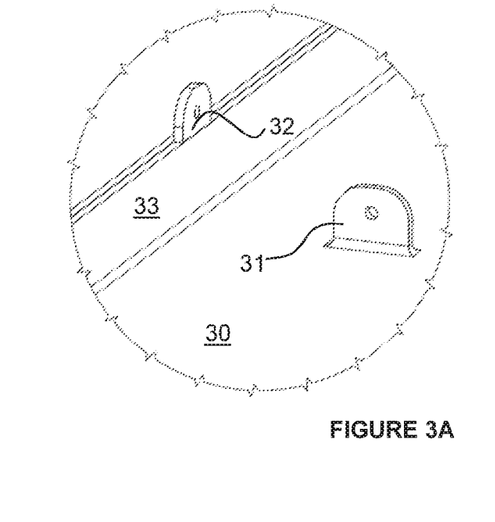
FIG. 3A shows examples of connection portions incorporated into a stiffening member of the hybrid component of the invention.

FIG. 3A shows greater detail of the attachment portions which can be provided on a first stiffening member. The first stiffening member 30 can have a first lug 31 either welded on to its base portion, or if the member is machined from a solid block, then the attachment portion 31 could be integrally formed by removal of adjacent material. Additionally or alternatively, attachment portion 32 can be provided projecting from a stiffening portion 33 of the stiffening member 30 to allow a connection to an adjacent component such as a rib or spar as shown in FIG. 2B.

Figure 3B:
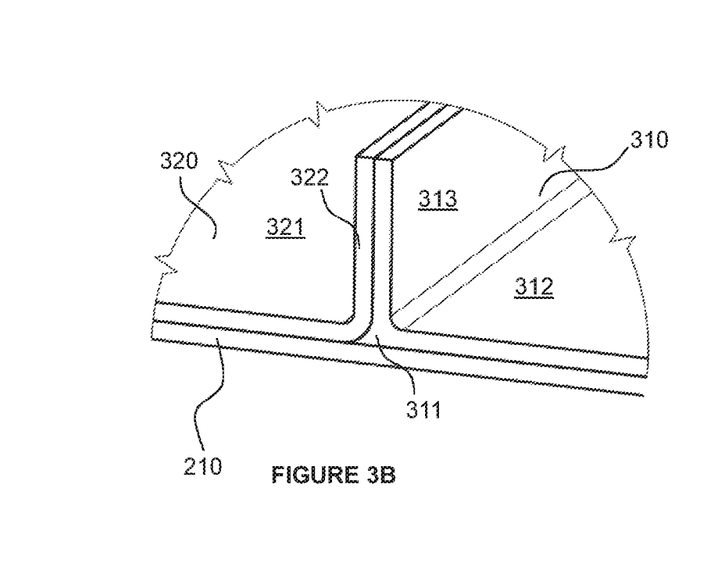
FIG. 3B shows a detail of a lip of a stiffening member of the invention.

FIG. 3B shows detail of an interface between a first stiffening member 310 and a second stiffening member 320. A lip 311 is provided projecting from the first stiffening member 310. The lip 311 is preferably located adjacent an interface between a base portion 312 and a stiffening portion 313 of the stiffening member 310. This arrangement is advantageous in particular where an adjacent, composite, second stiffening member 320 transitions from a base portion 321 and curves away from the body portion 210 of the component to form a stiffening portion 322 of the second stiffening member. As will be appreciated from the figure, in the absence of the projecting lip 311, a void would be created between the first and second stiffening member and the body 210. Such voids can be disadvantageous and may need to be filled with a filler or with a specifically profiled machined or moulded element, generally known as a 'noodle', to avoid the ingress of dirt, moisture or other unwanted materials, which could cause damage to the overall structural integrity of the component. The lip 311 therefore helps to avoid the need for filling of any such voids with additional elements which can complicate the manufacture and assembly procedure.

Figure 3C:
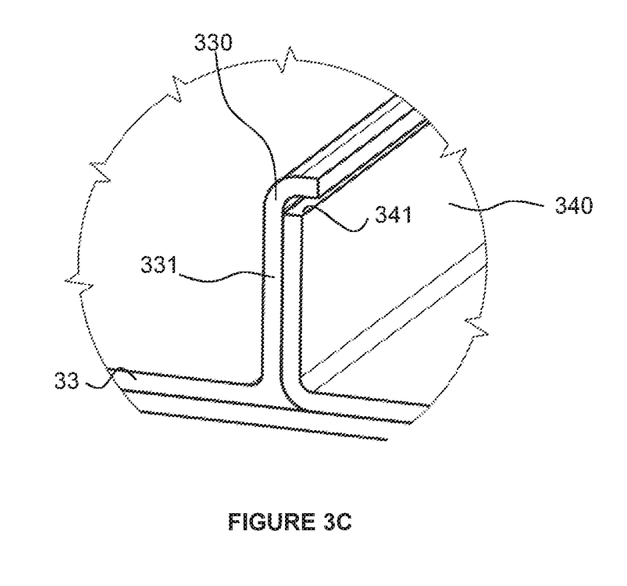
FIG. 3C shows detail of an edge protection portion of the invention.

FIG. 3C shows in greater detail a laterally extending edge protecting extension 330 of a further alternative arrangement for a first stiffening member 33. The lateral projection 330 can be provided at an edge of the stiffening portion 331 of the first stiffening member 33 and as shown in the figure it protects an edge 341 of an adjacent, composite, second stiffening member 340.

Figure 4A:
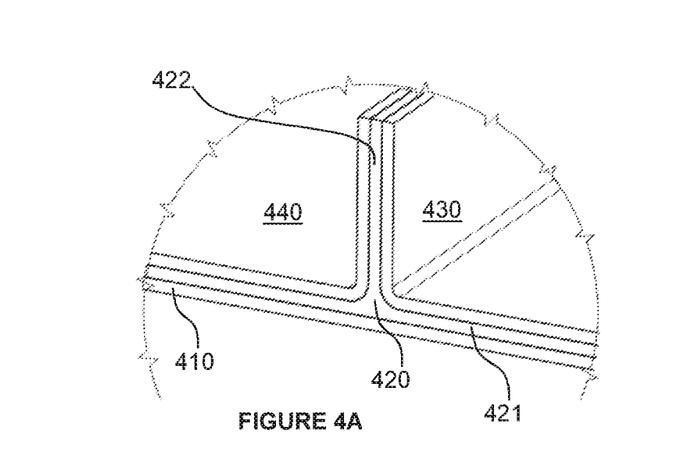
FIG. 4A shows detail of an alternative embodiment of a component according to the invention.

FIG. 4A shows detail of an arrangement of the structure of an alternative embodiment. In this embodiment, a body portion 410 has disposed upon it a first stiffening member 420 having a generally planar base and a stiffening portion 422. Second stiffening members 430 and 440 are disposed on either side of the stiffening portion 422 of the first stiffening member 420. In this manner, a single first stiffening member 420 can provide a rigid support to composite second stiffening members disposed on either side of stiffening portion 422.

Figure 4B:
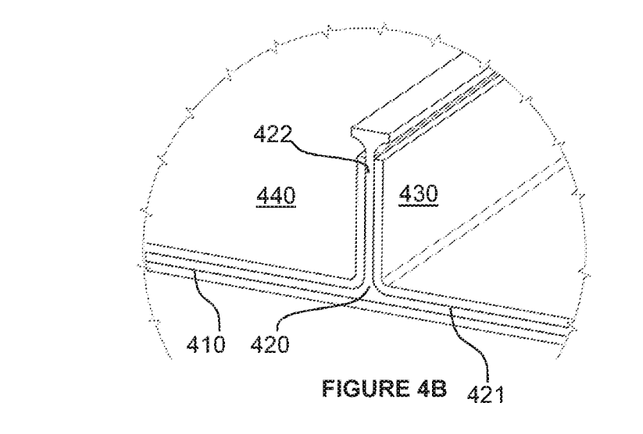
FIG. 4B shows detail of a further alternative arrangement of a component of the invention.

FIG. 4B shows a variant of the arrangement shown in FIG. 4A, in which the stiffening portion 422 of the first stiffening member 420 comprises a plurality of edge protecting extension portions, for protecting second stiffening members 430 and 440 disposed on opposing sides of the stiffening portion 422 of the first stiffening member 420.

Figure 4C:
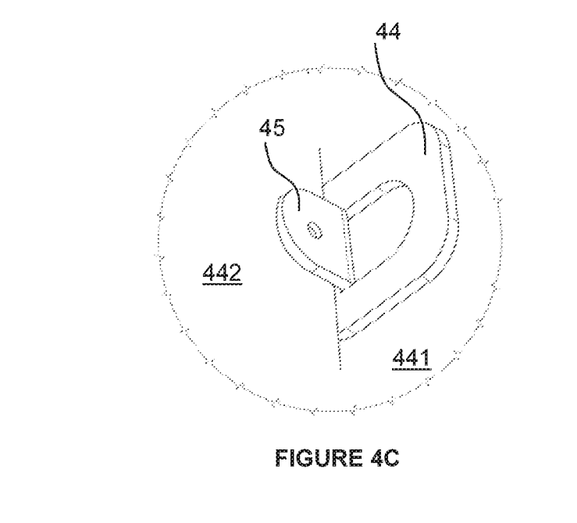
FIG. 4C shows detail of a co-cured composite attachment portion for use with the invention.

FIG. 4C shows an integrated co-cured composite lug attachment, which can be co-cured onto the base portion 441 of a second stiffening member to provide an attachment portion 45 for attachment to an adjacent component 442, such as a spar or rib, such as is generally illustrated in the assembly of FIG. 2A, for example.

Figure 4D:
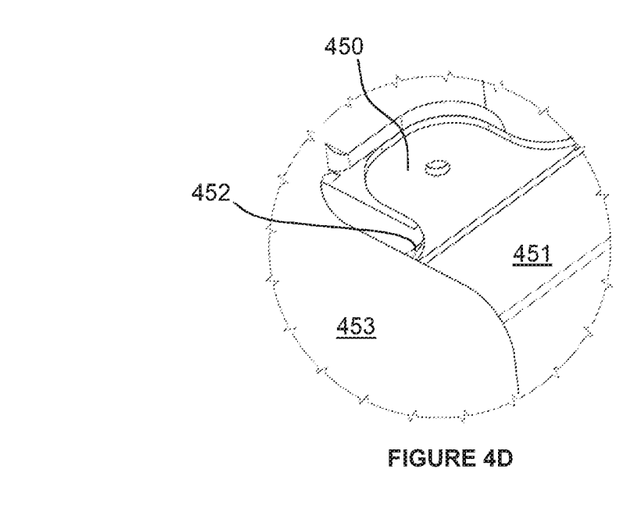
FIG. 4D shows detail of an assembly incorporating an element of the invention.

FIG. 4D shows further detail of a how an attachment portion 450 may be provided on a stiffening portion 422 of a first stiffening member 420 illustrated in FIGS. 4A and 4B, so that it projects from between neighbouring composite second stiffening members 451 and 452, to attach to an adjacent component 453 in a manner such as that illustrated in FIG. 2B.

Figure 5:
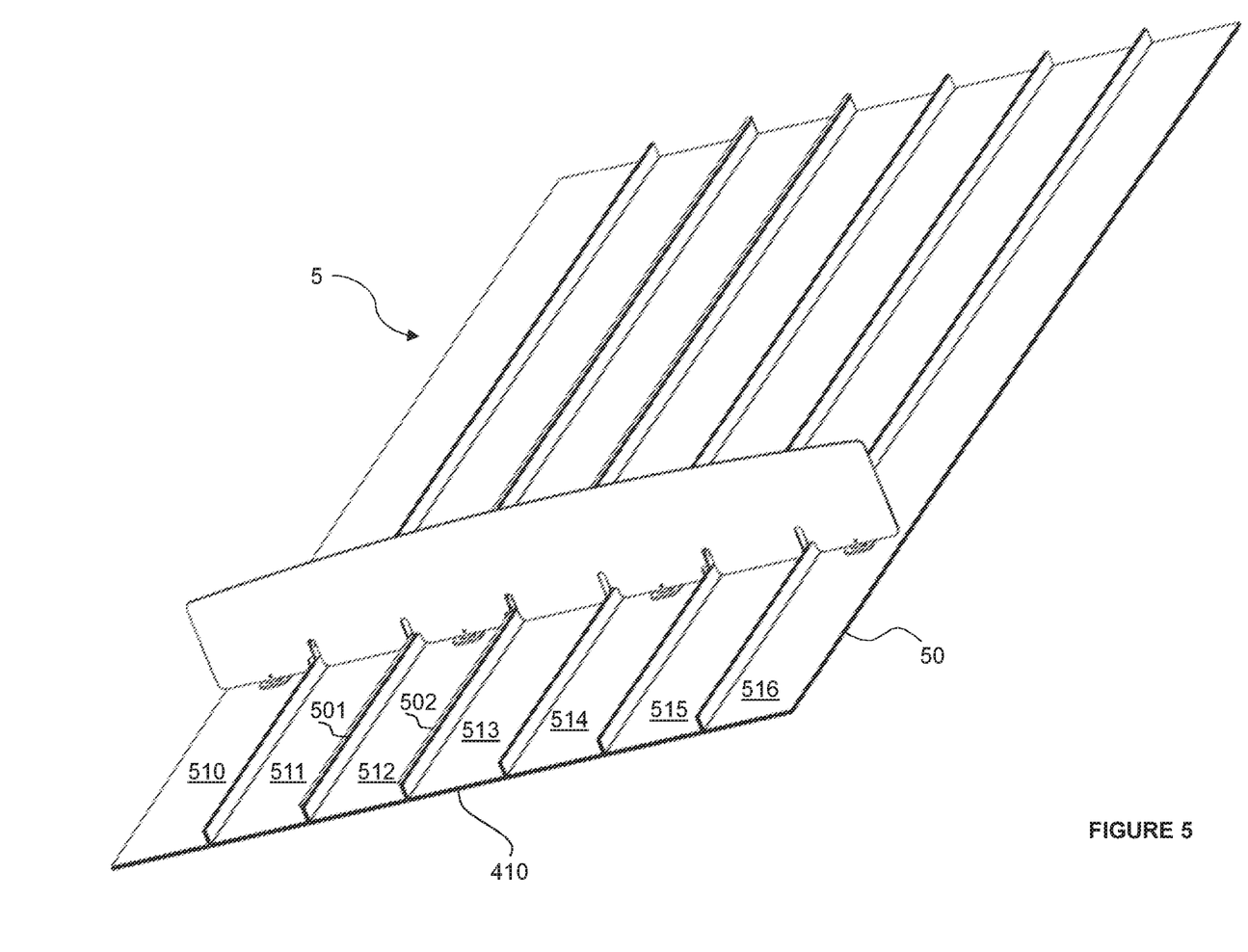
FIG. 5 shows an alternative assembly incorporating a second embodiment of the component of the invention.

FIG. 5 shows a hybrid component incorporating the elements shown in FIGS. 4A to 4D. In FIG. 5, the assembly 5 includes a component 450 which comprises a body portion 410, upon which is disposed a first stiffening member 420, detail of which is more clearly illustrated in FIGS. 4A and 4B. Optional laterally extending edge protection members 501 and 502 are preferably included adjacent second composite stiffening members 511, 512 and 513. Greater detail of these can be seen in FIG. 4B. In the arrangement of FIG. 5, composite second stiffening members are disposed alongside the first stiffening member 420, which preferably extends substantially over the entirety of the body 410. The second stiffening members 510, 511, 512, 513, 514, 515 and 516 are disposed on a generally planar base portion 421 of the first stiffening member 420 (as shown in FIGS. 4A and 4B). Each of the second stiffening members may comprise respective stiffening portions which extend away from the body 410 and are generally disposed against stiffening portions 422 of the first stiffening member 420. In this manner, the first stiffening member 420 comprises a plurality of channels, divided by a plurality of stiffening portions 422 of the first stiffening member. Disposed in at least one, and preferably in several or in all of the channels, is a composite second stiffening member, which comprises a base portion generally aligned parallel to the base portion 421 of the first stiffening member. The stiffening portion or portions of the second stiffening member or members are therefore supported and can be cured against and preferably bonded to the stiffening portion or portions 422 of the first stiffening member 420.

As will be appreciated, although the examples illustrated herein show a generally flat planar component, the structural components to which this invention is directed can also relate to the curved parts of a vehicle, preferably an aircraft, or any other structure. In particular, when considering forming a skin for a wing, the component will have an eventual outer profile corresponding to a part of an aerofoil. Similarly, when forming a component for a fuselage, the structure may be part-cylindrical. Other more complex curved surfaces can be envisaged, for example, wing to fuselage interfaces and engine cowlings, for example. Therefore, the term generally planar as used herein does not imply a flat surface, but generally implies a continuous surface, which may include curved, convex or concave portions.

Figure 6A:
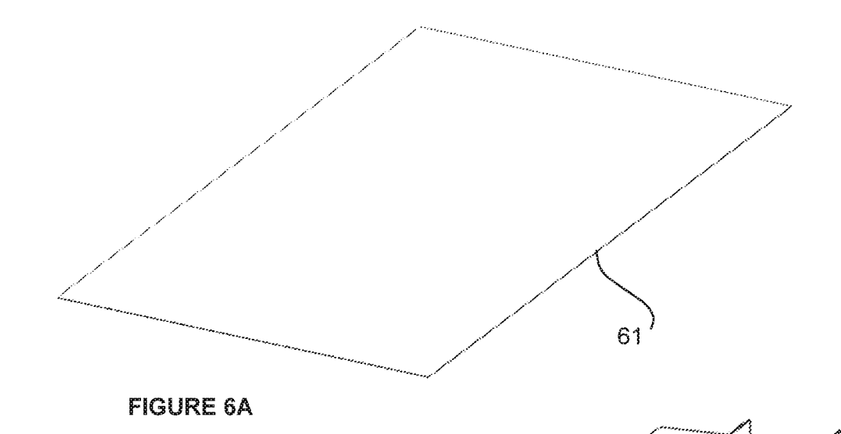
FIGS. 6A to 6C illustrate steps in a manufacturing process for forming a component of the invention.
Figure 6B:
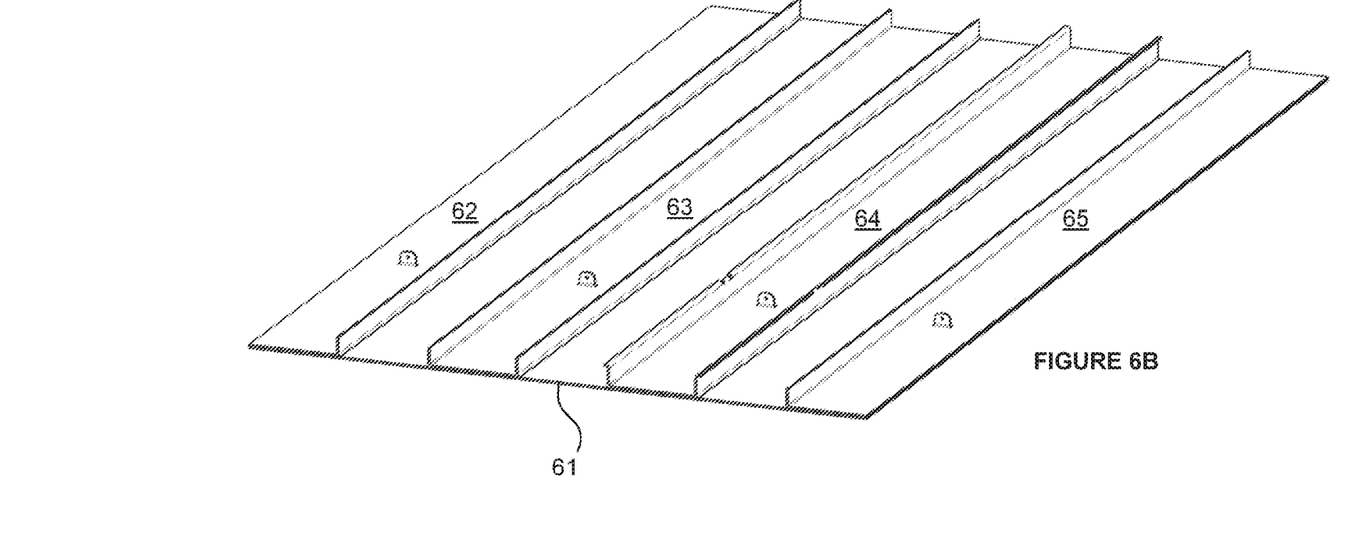
Figure 6C:
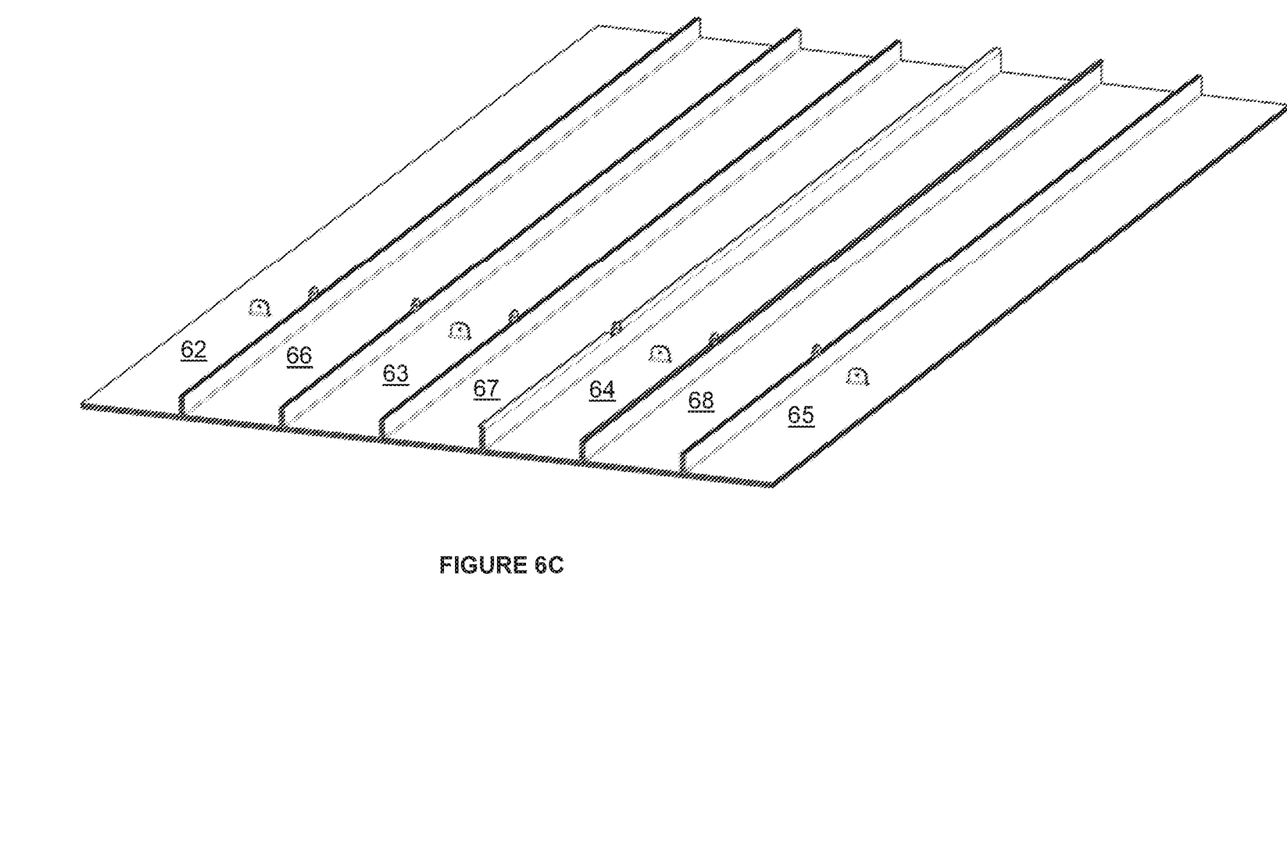

FIGS. 6A to 6C illustrate separate steps in a method of producing a hybrid component according to an embodiment of the invention. A first step, as illustrated in FIG. 6A, is to provide a body portion 61 as a lay-up, which comprises a generally sheet-like or web-like, flat or substantially curved but generally planar body portion and comprises, or preferably is entirely constructed from, a layup of a composite material, preferably in an uncured state.

FIG. 6B shows an arrangement of elements for forming a component, where a plurality of first, preferably metallic, stiffening members 62, 63, 64 and 65 have been arranged on the body portion 61. The first stiffening members are arranged in a generally longitudinal manner to provide longitudinal stiffness to the body portion 61. The first stiffening members can be bonded to the body portion 61, and this can be done via use of an adhesive film or any suitable glue or bonding agent. The stiffening members may be provided with any of the edge protecting features and/or connecting portions and lugs as described earlier in this specification.

In FIG. 6C, second stiffening members 66, 67 and 68 are provided on a further layup, disposed generally between the first stiffening members 62, 63, 64 and 65. Once the layup of the second stiffening members in between the first stiffening members is complete, it is possible to carry out vacuum bag curing of the overall structure using techniques which are generally known in the art for the curing of composite materials in vacuum bags and will be known to the skilled reader. Such processes are therefore not described in detail herein.

A slight variant of the method illustrated and described in relation to 6A to 6C can be employed to manufacture the component described and illustrated in FIG. 5. In the instance of that embodiment, the body can be provided as described in relation to 6A, in a further step, the first stiffening member 420 is applied to the body portion 410. Then, the second stiffening members are laid up in between the plural stiffening portions 422 of the first stiffening member 420, in a similar manner to that shown in FIG. 6C, to arrive at the general structure as illustrated in FIG. 5. Then, the overall component can be cured in a vacuum bag process in the same manner for either embodiment, as is generally known for vacuum curing for composite components.

As will be apparent from reading the present specification, the present invention can bring significant advantages to the manufacture of various structures. As an example, in the manufacture of a wing box for an aircraft wing structure, the present invention tailors the material properties to suit the varying requirements of different parts of the component. It also allows for more accurate manufacturing and assembly of structures with integrated connection points. The connection points can be provided on the metallic and/or composite elements of the hybrid component, and the positions of those connection points can be more accurately controlled in the final component. The invention is particularly advantageous for rib foot connections in wing manufacture, as it can provide edge protection to the composite elements of a wing structure. Further, due to the incorporation of metallic elements into the hybrid component, lightning strike tolerance can be built in via the conductivity of such metallic elements. This is particularly the case in the embodiment illustrated in FIG. 5, since the metallic properties of the first stiffening member extend throughout the hybrid component.

Improved lightning strike protection for aircraft can be achieved with the invention, due to the reduced number of fasteners which are required, since there is the potential to eliminate the standard procedure of spar bolting. Rib to cover bolting at one joint can also enable a complete conductive layer to be provided when using embodiments of the invention described herein. The invention can also provide improved fuel tank sealing due to the reduced number of fasteners required. Incorporating the integrated structure into a wing cover can also provide additional stiffness to the overall wing structure, which in turn can allow simplification of the manufacture of the overall wing structure, since fewer strengthening elements are required. Although the invention described herein generally relates to metallic and composite hybrid components, different combinations of stiffening or structural elements made from other materials with metallic and/or composite elements described herein, can be envisaged to provide further advantages. Use of components created in accordance with the invention can reduce the number of individual components needed for an overall structure due to the increased structural integrity and stiffness of each component used in the structure. This can reduce the number of joints required to assemble the overall structure. These factors can in turn: i) reduce the time and cost associated with controlling joints for tolerance and fit during manufacture; ii) improve the control of important tolerances at the points of fixation of the components: iii) provide potential for overall weight reduction in the complete structure, such as a wing box, due to the increased stiffness of the components; iv) reduce the number of fasteners required to integrate the structural components of the overall assembly, which can also lead to a time saving in the manufacturing process; v) improve fuel tank sealing because of the reduced number of fasteners needed in the structure which forms the fuel tank in an aircraft wing; and vi) introduce the potential to create a wing structure in which the butt straps traditionally required to join the cover to the leading and trailing edge parts may be eliminated, thus improving the efficiency of the overall wing structure.

Although the invention has been described above with reference to one or more preferred embodiments, it will be appreciated that various changes or modifications may be made without departing from the scope of the invention as defined in the appended claims.

The invention claimed is:

1. A method of making a hybrid metal-composite component for forming a generally sheet-like or web-like part of a structure, comprising steps of:
   a) providing a lay-up comprising a substantially sheet-like or web-like body portion comprising a composite material;
   b) arranging at least one first stiffening member on the body portion, the at least one first stiffening member comprising a metal and having at least one substantially planar stiffening portion extending away from the body portion, such that each first stiffening member has a cross-section that is I-shaped, U-shaped, or L-shaped;
   c) providing a further lay-up to form at least one second stiffening member comprising a composite material, the at least one second stiffening member having a substantially planar stiffening portion extending away from the body portion and being disposed adjacent the stiffening portion of the at least one first stiffening member; and
   d) curing the hybrid component to form a cured hybrid component with the at least one second stiffening member against the at least one first stiffening member to provide stiffness to the body portion and the at least one first stiffening member remaining a part of the hybrid component.

2. The method according to claim 1, wherein:
   in step b), the at least one first stiffening member has a plurality of substantially planar stiffening portions,
   in step c), the at least one second stiffening member is substantially U-shaped, the substantially planar stiffening portions being two substantially planar stiffening portions extending away from the body portion, such that each of the two substantially planar stiffening portions abuts a different one of the plurality of substantially planar stiffening portions of the at least one first stiffening member, and
   in step d), the at least one second stiffening member is formed against the different stiffening portions such that the at least one first stiffening member and the at least one second stiffening member provide stiffness to the body portion.

3. The method according to claim 1, wherein the at least one first stiffening member comprises one or more attachment portions disposed on at least one of a base portion and/or at least one stiffening portion thereof.

4. The method according to claim 1, comprising providing one or more co-cured composite attachment portions on the at least one second stiffening member.

5. The method according to claim 1, wherein the stiffening portion of the at least one first stiffening member comprises an edge protecting portion arranged to protect an edge of the at least one second stiffening member from damage.

6. The method according to claim 5, wherein the edge protecting portion is a laterally extending edge protecting extension for extending over the edge of the at least one second stiffening member to protect the edge from damage.

7. The method according to claim 1, wherein the at least one first stiffening member comprises a lip projecting laterally from the stiffening portion thereof to provide a smoothed contour between the body portion of the hybrid component and the stiffening portion of the at least one first stiffening member.

8. A hybrid metal-composite component for forming a generally sheet-like or web-like part of a structure, the hybrid component comprising:

a substantially sheet-like or web-like body portion comprising a composite material;

at least one first stiffening member comprising a metal and having a substantially planar stiffening portion extending away from the body portion, such that the at least one first stiffening member has a cross-section that is I-shaped, U-shaped, or L-shaped; and at least one second stiffening member comprising a composite material, the at least one second stiffening member having a substantially planar stiffening portion extending away from the body portion and being disposed adjacent the stiffening portion of the at least one first stiffening member;

wherein the hybrid component is a cured hybrid component so the at least one second stiffening member is against the at least one first stiffening member to provide stiffness to the body portion, with the at least one first stiffening member remaining a part of the hybrid component.

9. The hybrid component according to claim 8, wherein:
the at least one first stiffening member has a plurality of substantially planar stiffening portions,
the at least one second stiffening member is substantially U-shaped, the substantially planar stiffening portions being two substantially planar stiffening portions extending away from the body portion, such that each of the two substantially planar stiffening portions abuts a different one of the plurality of substantially planar stiffening portions of the at least one first stiffening member, and
the at least one second stiffening member is formed against the different stiffening portions such that the at least one first stiffening member and the at least one second stiffening member provide stiffness to the body portion.

10. The hybrid component according to claim 8, wherein the at least one first stiffening member comprises one or more attachment portions disposed on at least one of a base portion and/or at least one stiffening portion thereof.

11. The hybrid component according to claim 8, wherein the at least one second stiffening member comprises one or more co-cured composite attachment portions.

12. The hybrid component according to claim 8, wherein the stiffening portion of the at least one first stiffening member comprises an edge protecting portion arranged to protect an edge of the at least one second stiffening member from damage.

13. The hybrid component according to claim 12, wherein the edge protecting portion is a laterally extending edge protecting extension for extending over the edge of the at least one second stiffening member to protect the edge from damage.

14. The hybrid component according to claim 8, wherein the at least one first stiffening member comprises a plurality of edge protecting extension portions for protecting second stiffening members disposed on opposing sides of the stiffening portion of the at least one first stiffening member.

15. The hybrid component according to claim 8, wherein the at least one first stiffening member comprises a lip projecting laterally from the stiffening portion thereof to provide a smoothed contour between the body portion of the hybrid component and the stiffening portion of the at least one first stiffening member.

16. A structure comprising a hybrid component according to claim 8.

17. The structure according to claim 16, wherein the structure is an aircraft structure.

18. A hybrid metal-composite component for forming a generally sheet-like or web-like part of a structure, the hybrid component comprising:
a substantially sheet-like or web-like body portion comprising a composite material;
at least one substantially U-shaped first stiffening member comprising a solid material and having two substantially planar stiffening portions extending away from the body portion; and
at least one second stiffening member comprising a composite material, the at least one second stiffening member having a substantially planar stiffening portion extending away from the body portion and being disposed adjacent the stiffening portion of the at least one first stiffening member;
wherein the at least one second stiffening member is against the at least one first stiffening member to provide stiffness to the body portion.

19. The hybrid component according to claim 18, wherein:
the at least one first stiffening member has one or more substantially planar stiffening portions,
the at least one second stiffening member is substantially U-shaped, having two substantially planar stiffening portions extending away from the body portion such that each of the two substantially planar stiffening portions abuts a different stiffening portion of the at least one first stiffening member, and
the at least one second stiffening member is formed against the different stiffening portions such that the at least one first stiffening member and the at least one second stiffening member provide stiffness to the body portion.

20. The hybrid component according to claim 18, wherein the at least one first stiffening member comprises a metal.

* * * * *